G. FRECHEVILLE.
ELECTRICALLY OPERATED HORN FOR MOTOR VEHICLES.
APPLICATION FILED SEPT. 1, 1920.
1,373,496.
Patented Apr. 5, 1921.
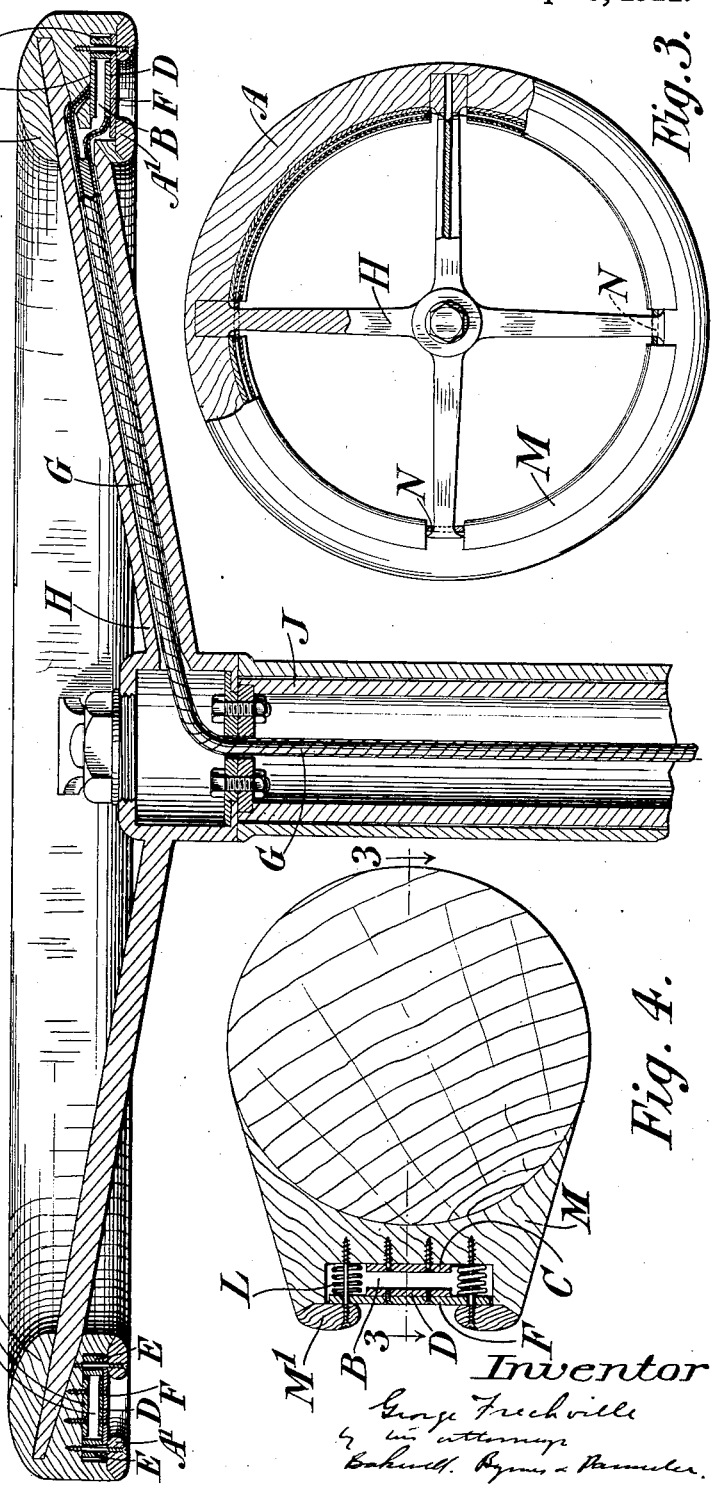
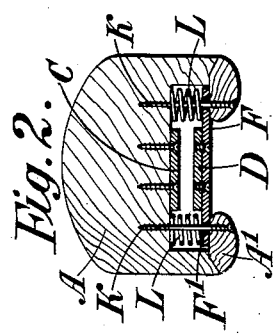
Inventor
George Frecheville

UNITED STATES PATENT OFFICE.

GEORGE FRECHEVILLE, OF LONDON, ENGLAND.

ELECTRICALLY-OPERATED HORN FOR MOTOR-VEHICLES.

1,373,496. Specification of Letters Patent. Patented Apr. 5, 1921.

Application filed September 1, 1920. Serial No. 407,545.

*To all whom it may concern:*

Be it known that I, GEORGE FRECHEVILLE, a subject of the King of England, residing at London, England, have invented certain new and useful Improvements in Electrically-Operated Horns for Motor-Vehicles, of which the following is a specification.

This invention is for improvements in or relating to electrically-operated horns for motor vehicles. The object of the present invention is to enable a driver to actuate an electrically-operated horn without releasing his grip on the steering wheel.

According to this invention the electric circuit which operates a motor horn is led to a contact, switch or the like, so disposed in the rim of the steering wheel that the driver can operate it with the tips of his fingers or thumb without releasing his grip of the wheel.

Preferably according to this invention a steering wheel, for use with an electrically operated horn for a motor vehicle, comprises the combination with a wheel rim countersunk around its periphery for example around its under surface, of two metal rings extending around the hollow thus formed, connected in the electrical circuit of the motor horn, normally held separated and insulated from one another but adapted to be pressed into contact to complete the electrical circuit and sound the horn.

The channels to contain the switch may conveniently be placed in other parts of the wheel rim than its under-surface (for example in the inside of the rim in the spaces between the radial arms of the steering wheel). For purposes of the application of the switch device to already existing steering wheels, the channels and switch elements may conveniently be provided in one or more fillets, which may be secured to the steering wheel rim.

Thus, in a device for enabling an electrically-operated motor horn to be actuated from the steering wheel, this invention comprises the provision on the steering wheel rim of channels extending around the inside of said rim between the radial arms, each said channel having combined in it two switch contacts connected in the electric circuit of the motor horn, one of which contacts is movable and is in the form of a metal quadrant, normally held separated and insulated from the corresponding fixed contact or contacts but adapted to be pressed into contact therewith. The fixed contacts may themselves be metallic plates or a series of metallic studs.

This invention further comprises the employment of one or more fillets arranged to be attached to the rim of a steering wheel and containing (1) channels which extend around or substantially around said rim, (2) two switch contacts in each channel connected in the electric circuit of the motor horn, one of which contacts is movable and is normally held separate and insulated from the corresponding fixed contact or contacts, but adapted to be pressed into contact therewith.

Thus, the invention includes the combination with a steering wheel for use with an electrically-operated horn for a motor vehicle, of quadrant-shaped fillets extending around the inside of the wheel rim between the radial arms and secured to said rim and provided with electrical contacts in the electric circuit of the motor horn, consisting of one quadrant-shaped metal plate fixed to the bottom of each said channel and a second quadrant-shaped movable metal plate attached to a plate of insulating material normally held separate and insulated from the fixed contact but adapted to be pressed into contact therewith.

In the accompanying drawings, which illustrate by way of example methods of carrying this invention into effect, Figure 1 is a section of one form of steering wheel embodying this invention, and Fig. 2 is a section of a rim showing another embodiment of this invention.

Fig. 3 is a plan of a steering wheel having the switch elements attached thereto in quadrant-shaped fillets, and Fig. 4 is a section of the rim and attached fillet.

Referring to Fig. 1, a portion of the rim A of the steering wheel, preferably on the under-surface, is counter-sunk, and in the hollow B thus formed is arranged a contact switch. Conveniently the switch may consist of two metal rings C and D extending around the whole or a large part of the rim of the steering wheel in the groove on its under-surface. These metallic plates are held apart in the groove at intervals by studs E made of suitable insulating material. The lower strip may be covered on its under side with insulating material F, and the lower strip is of such a nature that pressure on its insulating under-surface causes the lower strip to come into contact with the upper, thus completing the electric circuit and sounding the horn. The upper plate C is secured to the base of the slot B and the lower ring D, or preferably the plate of insulating material may be engaged at its edges by flange members $A^1$ secured to the rim A. The conducting wires G connected with the strips are led along a groove in one of the radial arms H, of the steering wheel, and then down the inside of the steering column J, so that the whole of the electric connections are compact and concealed.

Referring to Fig. 2, the insulating studs are dispensed with, the metal rings C and D do not extend out to the sides of the slot B but leave a clear space on each side. The insulated plate F, however, extends right across the slot B, and is perforated by holes $F^1$ engaged by positioning pins K, secured between the rim A and retaining flange members $A^1$, and disposed at intervals all around the rim. These positioning pins are surrounded by spiral springs L lying between the non-conducting plate F and the base of the slot B, so that the rings C and D are held apart and insulated from one another all around the rim, but can readily be pressed into contact at any point of their circumference against the action of the springs L.

Referring to Figs. 3 and 4, which illustrate the application of this invention to an existing steering wheel, the example illustrates the insertion of the switch in the inside of the rim between the radial arms of the steering wheel, so that the switch can be operated either by the tips of the fingers, or by pressure from the driver's thumb. The steering wheel A has four radial arms H. There is applied between each two adjacent arms a quadrant-shaped fillet M, conveniently of wood, or material similar to that of which the steering wheel is made. This fillet M on its inner surface is provided with a channel B in which the switch-contacts lie. At the bottom of the channel is a fixed contact C which may consist of a quadrant-shaped metal plate fixed to the bottom of the channel, or the equivalent thereof. The movable metal contact D, which may also be a quadrant-shaped metal plate, is narrower than the channel B, but is fixed to a plate F of insulating material which fits nicely in the channel. The plate of insulating material F and therefore the movable metal contact D, is held away from the fixed contact C by springs L, conveniently small spiral springs, disposed at the edges of the channel B, and the insulating plate F may be prevented from coming out of the channel by retaining flange members $M^1$. At the points of interruption caused by the radial arms H, the electrical connections may be completed by a short length of cable N.

By the arrangements embodying this invention the driver is able at all times to sound the horn without moving either of his hands from their accustomed positions on the wheel, and without releasing his grip, no matter in what position on the circumference of the wheel his hands may be.

The word "rim" as used in the claims is definitive either of the ordinary construction such as illustrated in Figs. 1 to 3 of the drawings, or of the composite construction comprising fillets, such as illustrated in Fig. 4.

What I claim as my invention and desire to secure by Letters Patent is:—

1. A vehicle steering wheel, comprising a rim having circumferentially extending members projecting therefrom, said rim and members presenting a circumferentially extending channel, a fixed contact plate secured in said channel, a movable contact plate normally separated therefrom and held in position by said members, and electrical connections for said plates.

2. A vehicle steering wheel, comprising a rim having circumferentially extending members projecting from one side thereof, said rim and members presenting a circumferentially extending channel, a fixed contact plate secured in said channel, a movable contact plate normally separated therefrom and held in position by said members, and electrical connections for said plates.

3. A vehicle steering wheel, comprising a rim having circumferentially extending members projecting therefrom, said rim and members presenting a circumferentially extending channel with said members projecting partially across the channel, a fixed contact plate secured in said channel, a movable insulating plate supported by said members, a contact plate secured to said insulating plate, means for maintaining said contact plates in normally separated relation, and electrical connections for said plates.

4. A vehicle steering wheel, comprising a rim having circumferentially extending members projecting from one side thereof, said rim and members presenting a circumferentially extending channel with said members projecting partially across the channel, a fixed contact plate secured in said channel, a movable contact plate held in position by said members, means for normally holding said plates separated, said means permitting the plates to be brought into contact, and electrical connections for said plates.

5. A vehicle steering wheel comprising a rim and radial arms, a fillet secured to the inside of said rim between said arms and constituting a continuation of said rim, said fillet having members projecting therefrom, said fillet and members presenting a channel, a fixed contact plate in said channel, a movable contact plate in said channel, and means for normally holding said plates in separated relation, said members limiting the movement of said movable plate in one direction.

6. A vehicle steering wheel having a rim and radial arms, fillets secured to the inside of said rim between said arms and shaped to conform to and to constitute an extension of said rim, said fillets having circumferentially extending members projecting therefrom, said fillets and members presenting a circumferentially extending channel, a fixed contact plate secured in said channel, a movable contact plate normally separated therefrom and held in position by said members, and electrical connections for said plates.

7. A vehicle steering wheel having a rim and radial arms, fillets secured to said rim and shaped to conform to and constitute an extension thereof, said fillets having circumferentially extending members projecting therefrom, said fillets and said members presenting circumferentially extending channels, a fixed contact plate secured in each of said channels, a movable contact plate in each of said channels, means for normally holding said plates in separated relation, and electrical connections for said plates, said members limiting the movement of said movable plates in one direction and forming guards preventing the accidental operation of said movable plates.

In testimony whereof I affix my signature.

GEORGE FRECHEVILLE.